United States Patent [19]

Kawamura et al.

[11] Patent Number: 5,307,099
[45] Date of Patent: Apr. 26, 1994

[54] FILM CARTRIDGE ACCOMODATING DEVICE WHICH PREVENTS PREVIOUSLY USED CARTRIDGES FROM BEING EMPLOYED IN A CAMERA OR THE LIKE

[75] Inventors: Kunio Kawamura, Kawachinagano; Shuji Izumi; Hiroyuki Okada, both of Sakai; Masaaki Chikasaki, Toyonaka; Michihiro Iwata, Sakai; Sadafusa Tsuji, Tondabayashi, all of Japan

[73] Assignee: Minolta Camera Kabushiki Kaisha, Osaka, Japan

[21] Appl. No.: 797,947

[22] Filed: Nov. 26, 1991

[30] Foreign Application Priority Data

Nov. 30, 1990 [JP] Japan ................... 2-338973
Dec. 26, 1990 [JP] Japan ................... 2-414774
Dec. 27, 1990 [JP] Japan ................... 2-416833

[51] Int. Cl.⁵ .................. G03B 17/02; G03B 17/26
[52] U.S. Cl. ........................ 354/21; 354/207; 354/275; 354/288
[58] Field of Search ............ 354/21, 207, 275, 288

[56] References Cited

U.S. PATENT DOCUMENTS

| | | | |
|---|---|---|---|
| 4,947,197 | 8/1990 | Smart et al. | 354/214 |
| 4,965,600 | 10/1990 | Smart et al. | 354/275 X |
| 4,980,709 | 12/1990 | Cocca | 354/173.1 |
| 4,994,828 | 2/1991 | Smart | 354/21 |
| 4,994,833 | 2/1991 | Cocca | 354/207 |
| 5,021,816 | 6/1991 | Pagano et al. | 354/275 |
| 5,032,861 | 7/1991 | Pagano | 354/275 |
| 5,047,794 | 9/1991 | Pagano et al. | 354/275 |
| 5,049,912 | 9/1991 | Pagano et al. | 354/275 |
| 5,049,913 | 9/1991 | Pagano et al. | 354/275 |
| 5,079,579 | 1/1992 | Pagano et al. | 354/288 |
| 5,142,316 | 8/1992 | Tanii et al. | 354/288 X |

Primary Examiner—Michael L. Gellner
Assistant Examiner—J. K. Han
Attorney, Agent, or Firm—Burns, Doane, Swecker & Mathis

[57] ABSTRACT

A camera which includes a film cartridge whose spool is adapted to be set in different rotational positions with respect to a film cartridge main body between unused state and used state of the film cartridge, and a camera body having a film cartridge accommodating portion, and is arranged to show that the film cartridge is in the used state when the used film cartridge is inserted in the accommodating portion of the camera body.

The film cartridge is provided with shaped portions having different shapes from each other corresponding to the two rotational positions, while the film cartridge accommodating portion of the camera body is provided with an ejecting member, a detecting member for detecting the state of use of the film cartridge through its movement controlled by the differently shaped portions of the film cartridge upon insertion of the film cartridge into the film cartridge accommodating portion, and a display member for detection to be shown at a predetermined position in responsive movement to the detecting member, upon detection that the film cartridge is in the used state by the detecting member.

6 Claims, 6 Drawing Sheets

Fig.10
Fig.9
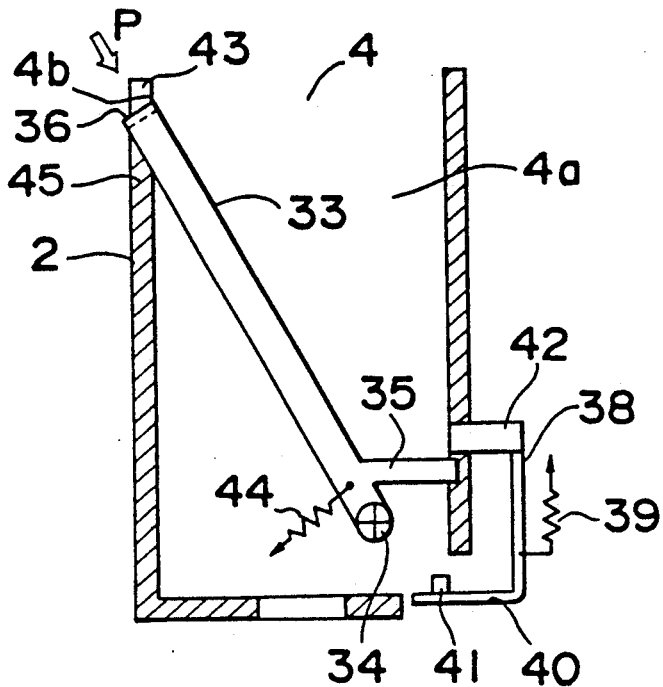
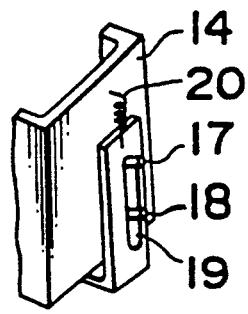
Fig.11
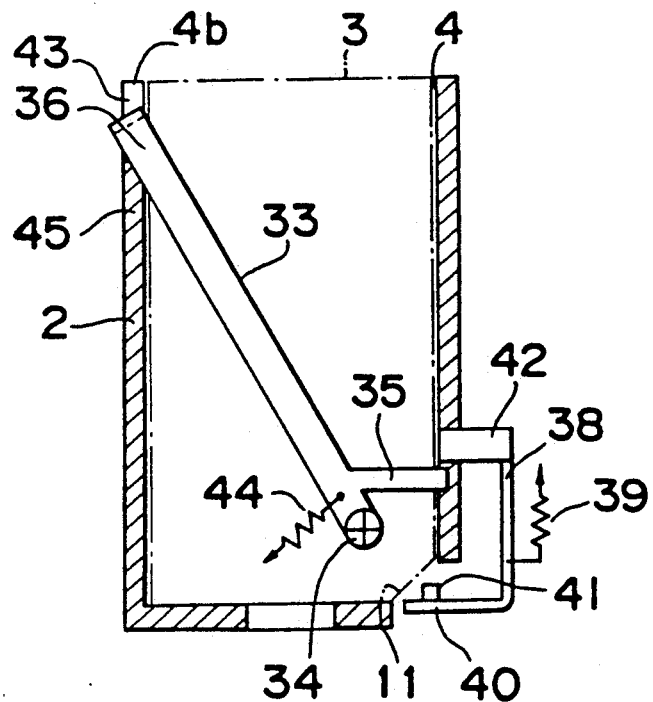

FILM CARTRIDGE ACCOMODATING DEVICE WHICH PREVENTS PREVIOUSLY USED CARTRIDGES FROM BEING EMPLOYED IN A CAMERA OR THE LIKE

BACKGROUND OF THE INVENTION

The present invention generally relates to an arrangement for a film cartridge for use in a photographic camera, and more particularly, to a camera of the above described type arranged to show different modes when a film cartridge of an unused state and that of a used state are loaded therein.

Conventionally, there has been shown in Japanese Patent Laid-Open Publication Tokka 2-114248, a camera system employing a film cartridge of a new type, in which different from a known film cartridge, the film is entirely accommodated in the film cartridge main body, and loading of the film onto the camera is automatically effected by rotating a fork and a spool engaged therewith by a motor. Therefore, it is difficult to judge, from external appearance, whether the film cartridge is in an unused state or in a used state. Accordingly, there is a possibility that photography is effected with a cartridge in the used state being loaded on the camera, thus undesirably resulting in double exposure.

In order to avoid such a disadvantage, it has been proposed to give different indications on the film cartridges between the used state and the unused state thereof. However, in the case where a user is unaware of such indications, etc., the possibility of double exposure can not be completely eliminated. Therefore, there has also been proposed an arrangement in which, by setting rotational angle positions of the spool to be different between the used film cartridge and the unused film cartridge, the spool is adapted not to engage the fork at the camera body side in the case of the used film cartridge (based on an assumption that an initial position of the fork is normally set to be at a predetermined rotational angle position, i.e. at the position corresponding to the spool of the unused film cartridge).

In the above arrangement, however, it has been still possible that the user forces the used film cartridge into a film cartridge accommodating chamber of the camera body, thereby damaging associated mechanisms or parts, etc. Furthermore, for preventing such damage, it has been necessary to preliminarily improve mechanical strength of the parts such as the fork, etc., which may result in higher cost.

SUMMARY OF THE INVENTION

Accordingly, an essential object of the present invention is to provide a camera which is so arranged that, although a used film cartridge may be loaded in a film cartridge accommodating portion of a camera body, a photograph can not be taken thereby.

Another object of the present invention is to provide a camera of the above described type which is simple in construction and accurate in function, and can be readily incorporated into various kinds of photographic cameras at low cost.

In accomplishing these and other objects, according to one aspect of the present invention, there is provided a camera for use with a film cartridge of the type including a spool adapted to be set in different rotational angles between an unused state and a used state of said film cartridge and different shapes from each other corresponding to the two rotational angles of the spool. The camera comprises;

a film cartridge accommodating portion, enabled to be selectively inserted into and drawn out from a camera body of said camera, for removably accommodating said film cartridge therein, and a stopper member for preventing insertion of said film cartridge accommodating portion into the camera body in response to the shaped portion corresponding to the film used state of the differently shaped portions of said film cartridge.

By the above arrangement of the present invention, the film cartridge can be loaded onto the film cartridge accommodating portion at all times irrespective of the unused state or used state. However, although further insertion of the film cartridge accommodating portion into the camera body is possible when a film cartridge of unused state is accommodated in the film cartridge accommodating portion, such insertion is impossible when a film cartridge of used state is accommodated therein.

Another aspect of the present invention pertains to a camera that is used with a film cartridge of the type includes a spool adapted to be set in different rotational angles between an unused state and a used state of the film cartridge, having a tapered portion at one portion of its peripheral portion and a film cartridge main body having a window portion formed at one portion thereof corresponding to the peripheral portion of said spool wherein the tapered portion is positioned at the window portion when said film cartridge is in the unused state, and at a position away from said window portion when said film cartridge is in the used state. This camera comprises;

a film cartridge accommodating portion, enabled to be selectively inserted into and drawn out from a camera body, of said camera, for removably accommodating said film cartridge therein, and an engaging member, provided at a position corresponding to the window portion to contact said spool within the window portion so as to be driven by said spool within said window portion, for allowing said film cartridge accommodating portion to be inserted into the camera body when the tapered portion is positioned within the window portion, and prohibiting said film cartridge accommodating portion to be inserted into the camera body when the tapered portion is not positioned within the window portion.

In a further aspect of the present invention, the camera that is used with a film cartridge of the type that includes a spool adapted to be set in different rotational positions between an unused state and a used state of said film cartridge and shaped portions having different shapes from each other corresponding to the two rotational positions of the spool. This comprises;

a film cartridge accommodating portion of said camera, for removably accommodating said film cartridge therein, and an ejecting member for ejecting a film cartridge accommodated in the film cartridge accommodating portion, a detecting member for detecting the state of use of said film cartridge through its movement controlled by the differently shaped portions of said film cartridge, and an eject-locking member for locking said ejecting member when said film cartridge is detected to be in the unused state by said detecting member, and not locking said ejecting member when said film cartridge is detected to be in the used state by said detecting member.

By the above arrangement of the present invention, although the used film cartridge can be accommodated into the accommodating portion, since the locking is not applied to the ejecting member, such a film cartridge is ejected at once upon removing the camera user's hand from the cartridge, so as not to be held in the accommodating portion. On the contrary, when an unused film cartridge is inserted, the ejecting member is locked, and thus, the film cartridge is not exposed out of the accommodating portion even when the user's hand is removed.

It is to be noted here that, in the above arrangement, if it is arranged to release the locking when the lid of the accommodating portion is closed, although the locking of the ejector is released by the closing of the lid in the case of the unused film cartridge, the film cartridge is held within the accommodating portion by the lid, and thus, the film cartridge is automatically ejected upon opening of the lid.

BRIEF DESCRIPTION OF THE DRAWINGS

These and other objects and features of the present invention will become apparent from the following description taken in conjunction with the preferred embodiment thereof with reference to the accompanying drawings, in which;

FIG. 9 is a fragmentary perspective view showing the construction at an essential portion in FIG. 6, FIG. 10 is a fragmentary cross sectional view showing the construction of the film cartridge accommodating portion of the camera body for a camera system according to a second embodiment of the present invention, FIGS. 11 and 12 are views similar to FIG. 10, which particularly show the cases where film cartridges with different states of use are inserted therein.

DETAILED DESCRIPTION OF THE INVENTION

Figure 1:
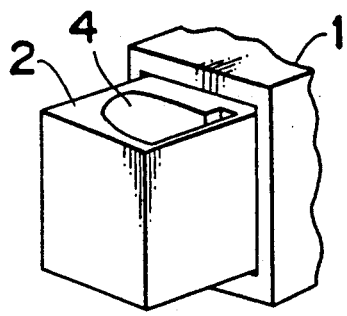
FIG. 1 is a fragmentary perspective view showing the relation between a camera body and a film cartridge accommodating portion.

Before the description of the present invention proceeds, it is to be noted that like parts are designated by like reference numerals throughout the accompanying drawings.

Figure 2:
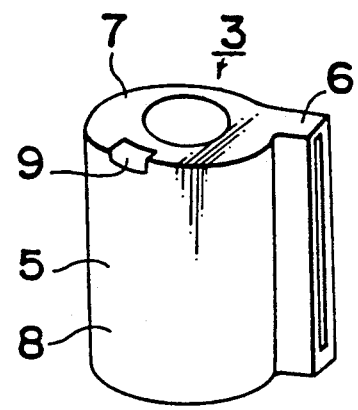
FIG. 2 is a perspective view of a film cartridge.

Referring now to the drawings, there is shown in FIG. 1, a camera according to one preferred embodiment of the present invention, which generally includes a camera body 1, and a film cartridge accommodating portion 2 for accommodating therein a film cartridge 3 (FIG. 2). The film cartridge accommodating portion 2 is arranged to be selectively inserted into and drawn out from said camera body 1, but not to be separated from said camera body.

Generally, at the central portion of the film cartridge accommodating portion 2, there is formed an film cartridge accommodating recess or chamber 4 corresponding in shape to the film cartridge 3 as shown in FIG. 2.

The film cartridge 3 includes a circular cylindrical portion 5 in which a spool 10 (FIG. 5) is incorporated, and a protruding portion 6 extending outwardly from said cylindrical portion 5 for pulling in or out the film therethrough, while window portion 9 is formed at part of an edge portion of the cylindrical portion 5 between an end flat portion 7 and a peripheral wall 8 thereof, with a portion of one flange 10a of the flanges 10a and 10b of the spool 10 adapted to be exposed from said window portion 9.

Figure 3:
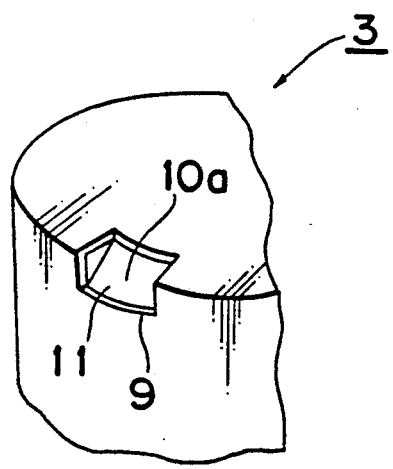
FIGS. 3 and 4 are fragmentary perspective views showing on an enlarged scale, an essential portion of the film cartridge in FIG. 2 in the unused state and the used state.
Figure 5:
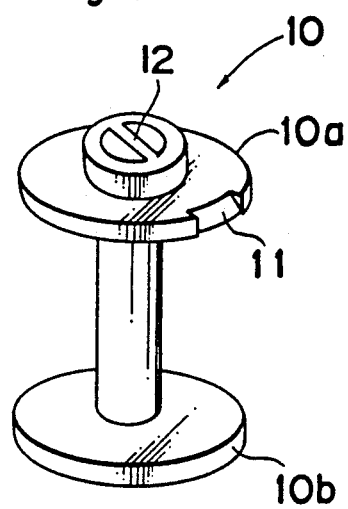
FIG. 5 is a perspective view showing a spool for the film cartridge.

More specifically, as shown in FIG. 5, the spool 10 has a tapered portion 11 formed at one portion on its flange 10a, and in the film cartridge 3 in an unused state, this tapered portion 11 is positioned in said window portion 9 so as to be exposed therefrom (FIG. 3).

Figure 4:
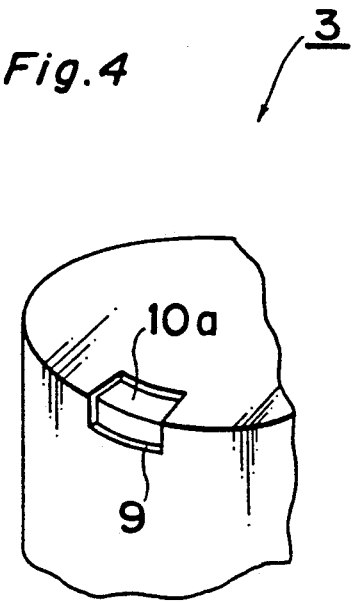

On the contrary, in the case of a film cartridge 3 in a used state, the portion of the flange 10a other than the tapered portion 11 is positioned at the window portion 9 (FIG. 4). It is to be noted here that the setting as referred to above has been effected at the stage of manufacture of film cartridges in the case of the film cartridge of the unused state, while in the case of the film cartridge of the used state, it is effected by a mechanism of the camera body or control at the side of the camera body. For example, with respect to the film cartridge in the used state, the setting of the rotational angle position of a fork (not shown) and that of the spline 12 (FIG. 5) engaged therewith under the state where the film has been completely used up, is arranged so that the tapered portion 11 dose not coincide with the window portion 9.

FIG. 3 shows the film cartridge 3 in the unused state in which the tapered portion 11 of the spool flange 10a is positioned at the window 9, while FIG. 4 represents the film cartridge 3 in the used state in which the portion of the spool flange 10a other than the tapered portion 11 is located within the window portion 9.

Figure 6:
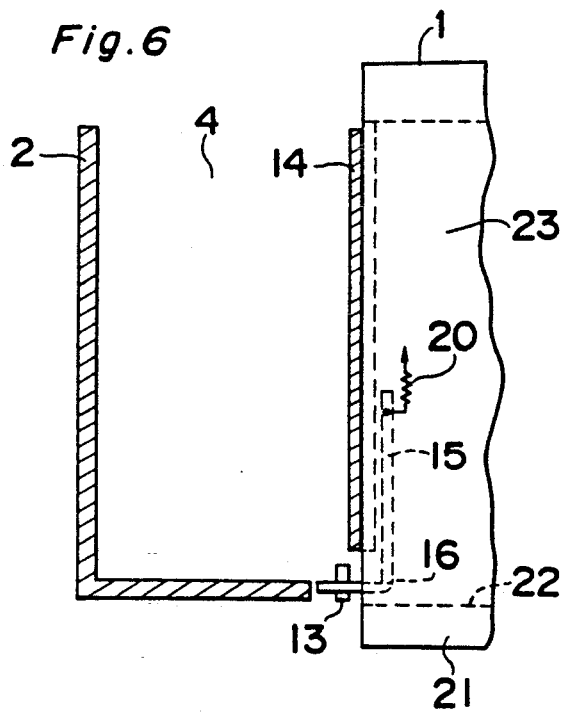
FIG. 6 is a fragmentary cross sectional view showing the construction of the film cartridge accommodating portion of the camera body for a camera system according to a first embodiment of the present invention.

Referring also to FIGS. 6 and 9 showing constructions at the side of the camera body, in the lower right end of the film cartridge accommodating chamber 4 of the film cartridge accommodating portion 2, there is disposed a detecting pin 13, which is provided on a lower L-shaped bent portion 16 of a detecting lever 15 vertically movably disposed along an outer face of a side wall 14 of the film cartridge accommodating portion 2.

More specifically, as shown in FIG. 9, on the side wall 14, there are provided a pair of spaced guide pins 17 and 18, which are engaged with an elongated opening 19 formed in a vertical direction in said detecting lever 15 normally urged upwardly by a spring 20 connected between an upper end of the lever 15 and the side wall 14.

Accordingly, in the state where the film cartridge 3 is not accommodated in the accommodating chamber 4, the detecting lever 15 and the detecting pin 13 are in a positional state as shown in FIG. 6, in which state, since the lower end of the detecting pin 13 is located higher than an inner wall 22 of the lower plate 21 of the camera body 1, it becomes possible for the film cartridge accommodating portion 2 to freely enter or come out from a chamber 23 of the camera body 1.

Figure 7:
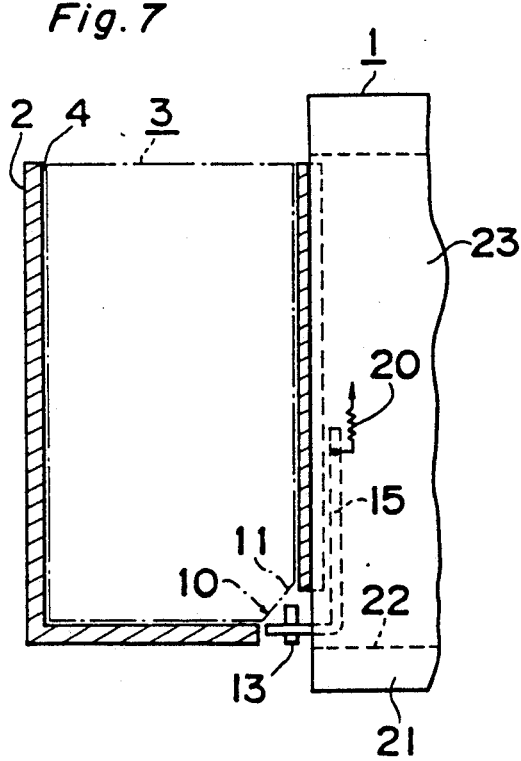
FIGS. 7 and 8 are views similar to FIG. 6, which particularly show the cases where film cartridges with different states of use are inserted therein.

FIG. 7 shows the state where the film cartridge 3 in the unused state is accommodated in the accommodating chamber 4, and in this state, since the detecting pin 13 can enter the window 9 of the film cartridge 3 in which the tapered portion 11 is located as shown in FIG. 3, it is held in the similar position as in FIG. 6. Consequently, the film cartridge accommodating portion 2 may be inserted into the chamber 23 of the camera body 1.

Figure 8:
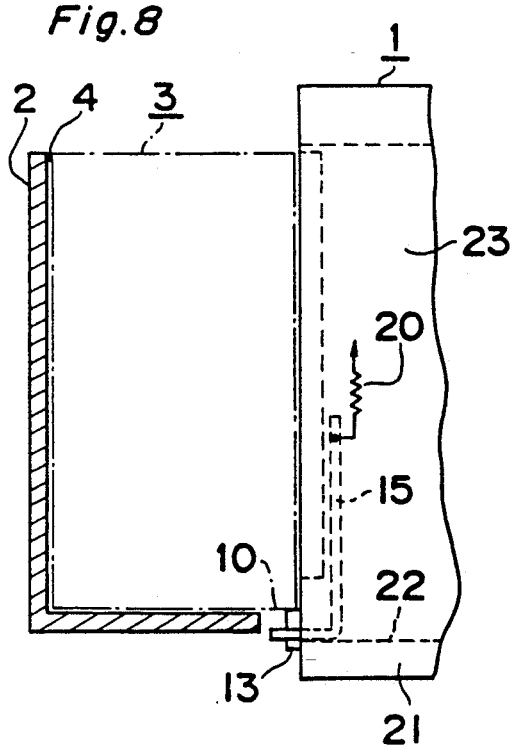

Meanwhile, when the film cartridge 3 in the used state is accommodated as shown in FIG. 8, the detecting pin 13 is pushed downwardly by the flange 10a of the spool 10 located within the window 9, with consequent lowering also of the detecting lever 15 downwardly. In this state, since the lower end of the detecting pin 13 is located at a position lower than the inner wall 22 of the lower plate 21 of the camera body 1, even if the film cartridge accommodating portion 2 is pushed towards the right in FIG. 8, it can not be inserted into the chamber 23 of the camera body 1.

By the arrangement according to the present invention as described so far, although the film cartridge 3 may be accommodated in the film cartridge accommodating portion 2 irrespective of its used state or unused state, the film cartridge 3 in the used state can not be accommodated into the camera body 1, and therefore, undesirable double exposure to the film is advantageously avoided. Moreover, since the film cartridge 3 can be once accommodated into the film cartridge accommodating portion 2, such a problem as damages to internal mechanisms of the film cartridge 3 by forcibly inserting the used cartridge into the film cartridge accommodating portion 2 may be solved.

Referring further to FIGS. 10 to 14, there is shown a camera according to a second embodiment of the present invention.

It is to be noted here that in the second embodiment to be described hereinafter, since the camera body, the film cartridge and the spool for the film cartridge, etc. are the same as those employed in the first embodiment described earlier with reference to FIGS. 1 to 9, detailed description thereof is abbreviated for brevity of explanation, with like part being designated by like reference numerals.

Figure 12:
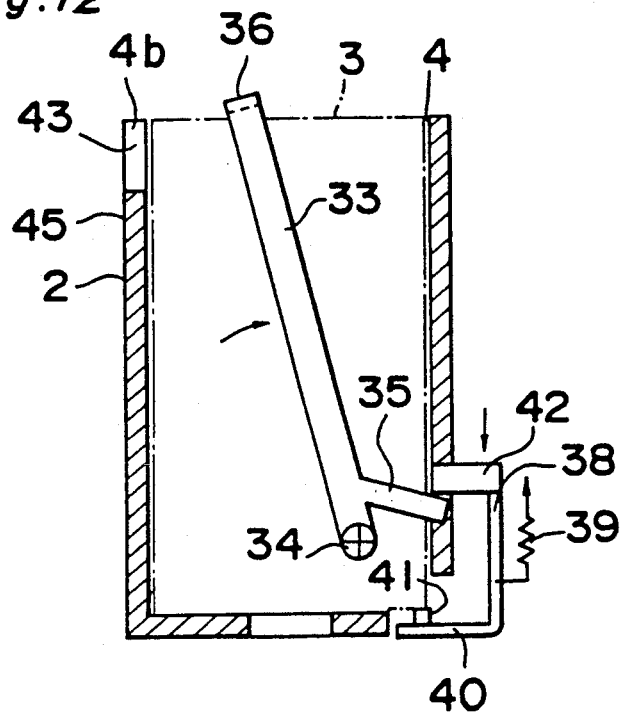
Figure 13:
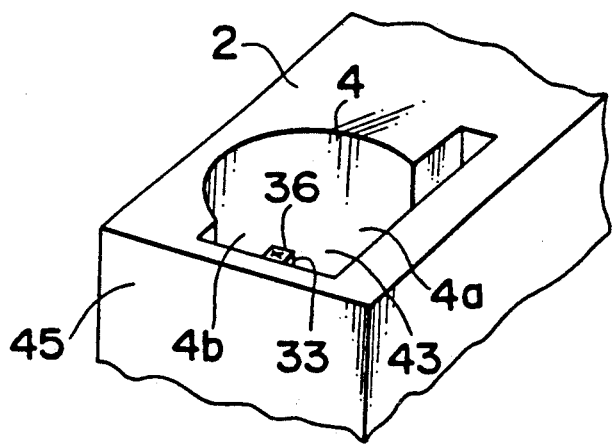
FIG. 13 is a fragmentary perspective view showing an external appearance of the film cartridge accommodating portion in the camera body.
Figure 14:
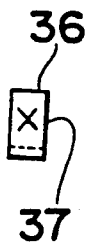
FIG. 14 is a top plan view showing on an enlarged scale, an upper portion of a display lever in FIG. 13.

In FIGS. 10 to 14 showing the construction at the side of the camera body 1, the film cartridge accommodating portion 2 is so arranged that a display lever 33 is movable within a space 4b having a notch or recessed portion 43 and formed adjacent to a film cartridge accommodating space 4a of the accommodating chamber 4 as shown in FIG. 13.

The display lever 33 adapted to be pivotable about a pivotal point 34 is normally kept stationary at a position as shown in FIG. 10 (i.e. a position where the top portion of the display lever 33 is not readily observed from above) by an urging force of a spring 44 connected between the lever 33 and the lower portion of the chamber 4, and also by the side wall 45 at the lower portion of the space 4b. The display lever 33 is formed with an engaging piece 35 extending rearwardly (towards the right in FIG. 10) from its portion close to the pivotal point 34, and has a display mark 37 (shown in FIG. 14) applied at the top portion 36 thereof. It is to be noted here that the top portion 36 is formed by bending the upper portion of the lever 33 at right angles with respect to its longitudinal direction, thereby to form a projection for the top portion 36. At the right lower portion in FIG. 10, there is provided a detecting lever 38 which is urged upwardly by a spring 39, but limited in its movement beyond the position of FIG. 10. The detecting lever 38 is bent at the lower portion into an L-shape, and provided with a detecting pin 41 on a horizontal portion 40 at the lower end thereof. This detecting pin 41 confronts the window 9 of the cartridge 3 referred to earlier. Above the detecting lever 38, a contact portion 42 to be engaged with the engaging piece 35 of the display lever 33 is provided.

Subsequently, functions of the arrangement when the film cartridge 3 is inserted will be described.

In the first place, when the accommodating chamber 4 is empty, the display lever 33 and the detecting lever 38 are in the state of FIG. 10. When the unused film cartridge 3 is inserted in the above state, the detecting pin 41 partly enters the window 9 of the cartridge 3, but, since the tapered portion 11 on the flange 10a of the spool 10 is positioned within the window 9 (FIG. 3), the detecting pin 41 is not applied with any force by the spool 10 (accordingly, by the film cartridge 3). Therefore, the detecting lever 38 remains stationary, and thus, the display lever 33 does not appear at the position which can be observed from above.

Meanwhile, when the used film cartridge 3 is inserted into the accommodating chamber 4, since the portion other than the tapered portion 11 of the spool 10 is located in the window 9 of the film cartridge 3 (FIG. 4), the detecting pin 41 is depressed by the spool 10, and thus, the entire detecting lever 38 is displaced downwardly. As a result, the display lever 33 is subjected to a clockwise rotation through engagement of the engaging piece 35 thereof with the contact portion 42 of the detecting lever 38, and thus, the display lever 33 is pivoted as shown in FIG. 12. In this case, since the display lever 33 is to be located in the vicinity of the central portion within the space 4b as shown in FIG. 13, the top portion 36 thereof can be seen from above. Thus, by causing the mark 37 at the top portion 36 of the display lever 33 to be observed by a user, it may be recognized that the inserted film cartridge 3 is in the used state.

In the above second embodiment of the present invention, since the top portion 36 of the display lever 33 is located within the recess 43 for the space 4b formed in the side wall 45 of the accommodating chamber 4 when the chamber 4 is empty (FIG. 10) and when the unused film cartridge 3 is inserted therein (FIG. 11), the mark 37 thereof is not readily seen from above, but may be observed in some cases if viewed in a direction of an arrow P (FIG. 10). Therefore, the arrangement may, for example, be so modified that the recess 43 may be replaced by a hole (not particularly shown) formed in the side wall, so that the top portion 36 may be hidden by such a hole.

According to the above embodiment, since it is so arranged that the display member appears at the predetermined position upon insertion of the used film cartridge into the accommodating portion, it is positively found that the loaded film cartridge is of the used one. Accordingly, the undesirable double exposure of the used film by the user can be advantageously prevented. Moreover, owing to the construction that even the used film cartridge may be loaded into the accommodating portion, there is no inconvenience that the mechanisms and parts within the accommodating portion are damaged by the forcible insertion, and thus, it is not necessary to particularly increase the strengths of such mechanisms and parts.

Referring further to FIGS. 15 to 19, there is shown a camera according to a third embodiment of the present invention.

It is to be noted here that in the third embodiment to be described hereinafter also, since the camera body, the film cartridge and the spool for the film cartridge, etc. are the same as those employed in the first embodiment described earlier with reference to FIGS. 1 to 9, detailed description thereof is abbreviated for brevity of explanation, with like part being designated by like reference numerals.

Figure 15:
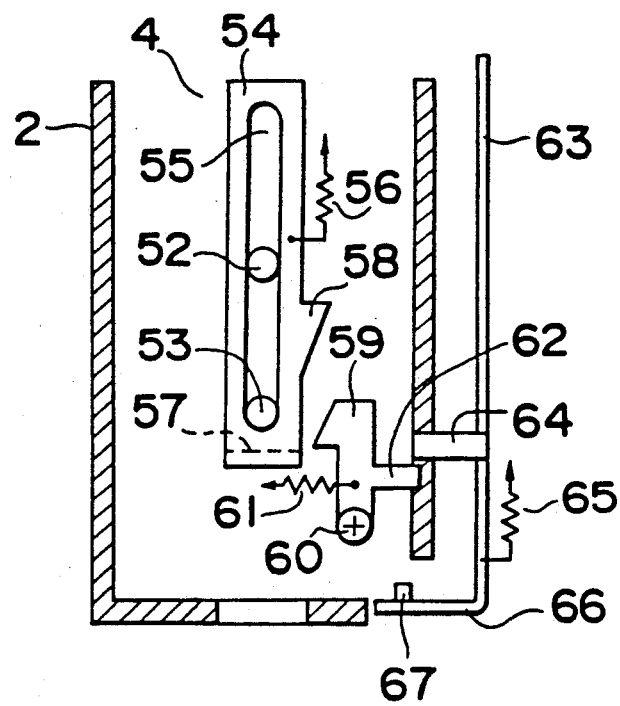
FIG. 15 is a fragmentary cross sectional view showing the construction of the film cartridge accommodating portion of the camera body for a camera system according to a third embodiment of the present invention.
Figure 19:
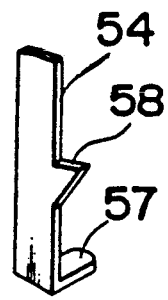
FIG. 19 is a perspective view showing on an enlarged scale, an ejector employed in the arrangement of FIG. 15.

In FIGS. 15 to 18 showing the construction at the side of the camera body 1, the film cartridge accommodating portion 2 is provided with an ejector 54 adapted to be vertically displaceable by guide pins 52 and 53 projecting from one side wall of the accommodating chamber 4. More specifically, the ejector 54 has an elongated opening 55 axially formed therein and engaged with said guide pins 52 and 53, and is normally urged upwardly by a spring 56 connected between an intermediate portion of said ejector 54 and the side wall. As shown in FIG. 19, the ejector 54 is formed, at its lower end, with a placing portion 57 on which the film cartridge 3 is to be placed, and, at its intermediate side edge, with a stopper rib 58 extending outwardly therefrom in a direction normal to the direction of the placing portion 57 as shown. This stopper rib 58 is adapted to be engageable with a locking member 59 which is arranged to be pivotable about a pivotal point 60, and is normally urged counterclockwise in FIGS. 15 to 18 by a spring 61. The locking member 59 has a projection 62, and a projecting piece 64 of a detecting lever 63 is arranged to contact said projection 62 of the locking member 59 from above. Accordingly, the locking member 59 is urged counterclockwise by the spring 61, but it can not be pivoted due to the contact between the projection 62 and the projecting piece 64 and is maintained at a state of equilibrium as shown in FIG. 15. Although the detecting lever 63 is urged upwardly by a second spring 65, it is limited in its displacement so as not to be moved upwardly beyond the position in FIG. 15. The lower end of the detecting lever 63 is bent into an L-shape, with a detecting pin 67 being provided on a horizontal portion 66 thereof. The detecting pin 67 confronts the window 9 of the film cartridge 3.

Subsequently, functioning of the ejector 54 and the locking member 59 will be described.

Figure 16:
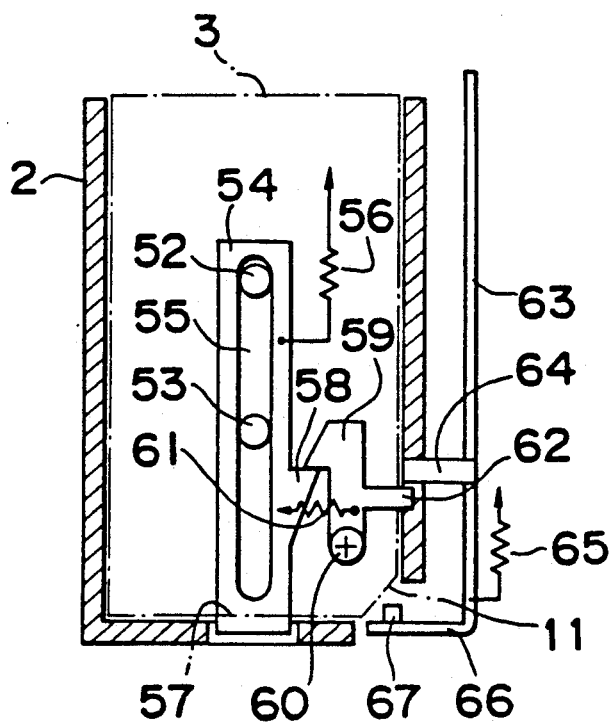
FIG. 16 is a view similar to FIG. 15, which particularly shows the case where an unused film cartridge is inserted therein.
Figure 17:
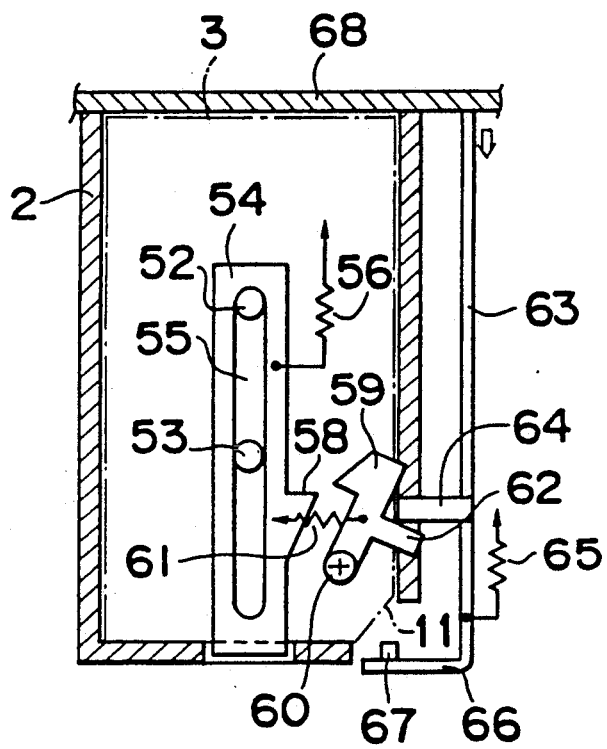
FIG. 17 is a view similar to FIG. 16, showing the state where a lid is closed.

In the first place, when the accommodating chamber 4 is empty, the state will be as shown in FIG. 15 upon opening of a lid 68 (FIG. 17). In the state of FIG. 15 when the unused film cartridge 3 is inserted into the accommodating chamber 4, the ejector 54 is lowered downwardly, with the locking member 59 engaged with the stopper rib 58 of the ejector 54 to establish the state as shown in FIG. 16. Upon closing of the lid 68 in the above state (shown in FIG. 17), the detecting lever 63 is lowered as it is depressed by the lid 68, and the locking member 59 is rotated clockwise by the projecting piece 64 of the detecting lever 63, and thus, the ejector 59 is disengaged from the stopper rib 58. Since the lid 68 is separately locked with respect to the camera body 1, the cartridge 3 is depressed downwardly by the lid 68, and the ejector 54 is maintained in the state of FIG. 17. In this case, if the lid 68 is open, the ejector 54 is displaced upwardly through the urging force by the spring 56, and the film cartridge 3 is to be exposed outside from the accommodating chamber 4.

Figure 18:
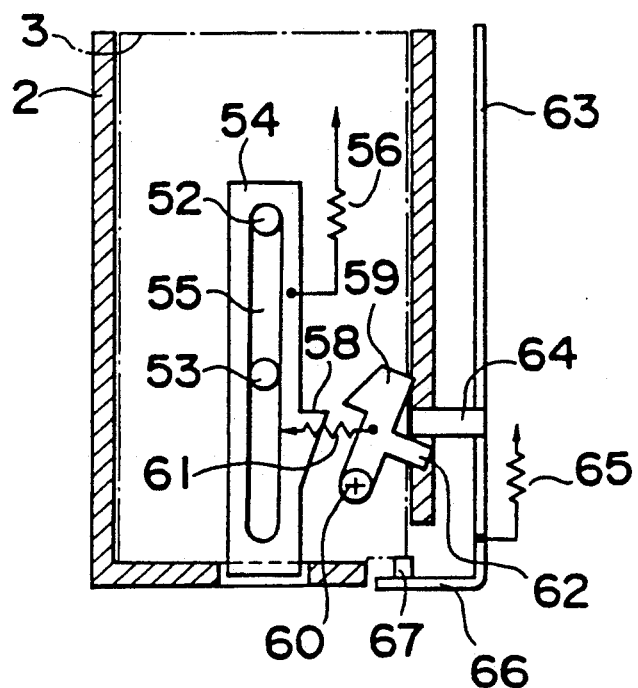
FIG. 18 is a view similar to FIG. 15, which particularly shows the case where a used film cartridge is inserted therein.

Meanwhile, when the used film cartridge 3 is inserted into the accommodating chamber 4, since the portion of the spool flange 10a other than the tapered portion 11 is located at the window portion 9 of the film cartridge 3, the detecting pin 67 is pushed downwardly by said portion as shown in FIG. 18, and the detecting lever 63 is brought into the state lowered downwardly. Therefore, the locking member 59 can not lock the ejector 54, and accordingly, the film cartridge 3 is discharged outside before closing the lid 68. By this arrangement, not only the possibility of undesirably subjecting the used film to double exposure can be eliminated, but it may be recognized that the film cartridge 3 is in the used state.

As is clear from the foregoing description, according to the third embodiment of the present invention, although the used film cartridge may be inserted into the accommodating portion, since the ejecting member is not locked, the film cartridge is immediately ejected outside from the accommodating portion discharged outside upon removal of hand, and can not be kept accommodated therein. Accordingly, the danger of undesirably subjecting the used film to the double exposure may be completely eliminated, while, since such used film cartridge can be inserted into the accommodating portion, the problem that the internal mechanism of the accommodating portion is damaged by forcibly inserting the used film cartridge into the accommodating portion, etc. can be advantageously solved.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as includes therein.

What is claimed is:

1. A camera for use with a film cartridge of the type including a state indicating means which is set at different indications to distinguish between an unused state and a used state of said film cartridge, said camera comprising;

a film cartridge accommodating portion, which can be selectively inserted into and drawn out from a camera body, of said camera, for removably accommodating said film cartridge therein, and a device for preventing insertion of said film cartridge accommodating portion into the camera body in response to an indication by said state indicating means which corresponds to the used state of said film cartridge.

2. A camera for use with a film cartridge of the type including a state indicating means which is set at different indications to distinguish between an unused state and a used state of the film cartridge, said camera comprising;
   a film cartridge accommodating portion, which can be selectively inserted into and drawn out from a body of said camera, for removably accommodating said film cartridge therein, and
   an engaging member for allowing said film cartridge accommodating portion to be inserted into said camera body when the indication by said state indicating means shows the unused state, and prohibiting said film cartridge accommodating portion from being inserted into the camera body when the indication by said state indicating means shows the used state.

3. A camera for use with a film cartridge of the type which includes a state indicating means capable of being selectively set in a first position corresponding to a first state wherein said film cartridge is unused and a second position corresponding to a second state wherein said film cartridge is used, said camera comprising;
   a film cartridge accommodating portion, which can be selectively inserted into and drawn out from a camera body of said camera, for removably accommodating said film cartridge therein,
   means for detecting whether the state indicating means is set in the first position or the second position when said film cartridge is accommodated in said film cartridge accommodating portion, and
   means responsive to said detecting means, for preventing said film cartridge accommodating portion from being inserted into the camera body when the state indicating means is set in the second position.

4. A camera according to claim 3, wherein the state indicating means includes a spool of said film cartridge, said spool having a first shaped portion corresponding to the first state and a second shaped portion corresponding to the second state, the shape thereof being different from that of the first shaped portion, and said detecting means detects the position of said state indicating means on the basis of difference between the two shapes of the first and second shaped portions.

5. A camera comprising;
   a film cartridge accommodating portion, which can be selectively inserted into and drawn out from a camera body of said camera, for removably accommodating a film cartridge therein,
   means for detecting whether the film cartridge accommodated in said film cartridge accommodating portion is an unused film cartridge or a used film cartridge, and
   means responsive to said detecting means, for preventing said film cartridge accommodating portion from being inserted into the camera body when a used film cartridge is accommodated in said film cartridge accommodating portion.

6. An apparatus comprising:
   a film cartridge accommodating portion, which can be selectively inserted into and drawn out from a body of said apparatus, for removably accommodating a film cartridge therein,
   means for detecting whether the film cartridge accommodated in said film cartridge accommodating portion is usable or unusable in said apparatus, and
   means responsive to said detecting means, for preventing said film cartridge accommodating portion from being inserted into the camera body when an unusable film cartridge is accommodated in said film cartridge accommodating portion.

* * * * *